US 8,789,816 B2

(12) United States Patent
Cocca et al.

(10) Patent No.: US 8,789,816 B2
(45) Date of Patent: Jul. 29, 2014

(54) HAND PROTECTION SAFETY APPARATUS FOR USE WITH SHEAVES AND PULLEYS

(71) Applicants: Joseph D. Cocca, Houston, TX (US); John Ryan, III, Houston, TX (US)

(72) Inventors: Joseph D. Cocca, Houston, TX (US); John Ryan, III, Houston, TX (US)

(73) Assignee: Alexander/Ryan Marine & Safety Co., Houston, TX (US)

( * ) Notice: Subject to any disclaimer, the term of this patent is extended or adjusted under 35 U.S.C. 154(b) by 148 days.

(21) Appl. No.: 13/650,393

(22) Filed: Oct. 12, 2012

(65) Prior Publication Data

US 2014/0106916 A1    Apr. 17, 2014

(51) Int. Cl.
*B66D 3/06*    (2006.01)
*F16P 1/02*    (2006.01)

(52) U.S. Cl.
CPC ........................................ *F16P 1/02* (2013.01)
USPC .......................................... 254/403; 254/411

(58) Field of Classification Search
CPC ....................................................... F16P 1/02
USPC .................. 254/401, 402, 403, 405, 406, 411
See application file for complete search history.

(56) References Cited

U.S. PATENT DOCUMENTS

| | | | |
|---|---|---|---|
| 968,304 A | 8/1910 | Winslow | |
| 1,175,065 A | 3/1916 | Kotten | |
| 1,538,853 A * | 5/1925 | Hazelton | 474/144 |
| 1,820,322 A | 8/1931 | Polkosnik | |
| 3,899,158 A * | 8/1975 | Johnson | 254/405 |
| 4,114,473 A | 9/1978 | Pollak | |
| 4,139,064 A | 2/1979 | Dobberpuhl | |
| 4,325,537 A * | 4/1982 | Winter et al. | 254/405 |
| 4,648,855 A | 3/1987 | Palloch et al. | |
| 4,917,656 A | 4/1990 | Sato et al. | |
| 5,180,343 A | 1/1993 | Reed | |
| 5,368,281 A * | 11/1994 | Skyba | 254/391 |
| 5,461,848 A | 10/1995 | Anthony | |
| 5,645,269 A * | 7/1997 | Peterson | 254/398 |
| 5,957,796 A | 9/1999 | McLean | |
| D540,256 S | 4/2007 | Bullock, Jr. | |
| 7,347,411 B1 * | 3/2008 | Teel et al. | 254/405 |
| 7,431,269 B2 * | 10/2008 | Carlson et al. | 254/405 |
| 7,562,862 B1 * | 7/2009 | Jackson | 254/376 |
| 7,735,809 B2 * | 6/2010 | Maire | 254/396 |
| 2011/0224040 A1 * | 9/2011 | Boissonneault et al. | 474/146 |

* cited by examiner

*Primary Examiner* — Emmanuel M Marcelo
(74) *Attorney, Agent, or Firm* — Egbert Law Offices, PLLC

(57) ABSTRACT

A safety apparatus has a sheave with a surface extending circumferentially therearound, a first housing interconnected to the sheave, a second housing interconnected to the sheave and pivotally connected to the first housing, and a line extending over the surface of the sheave and through, an inferior of each of the first housing and the second housing. Each of the first and second housings has a hole formed at an end opposite the sheave. The line has a first portion extending through the hole of the first housing and a second portion extending through the hole of the second housing. Bushings are respectively received within the holes of the housings.

18 Claims, 3 Drawing Sheets

HAND PROTECTION SAFETY APPARATUS FOR USE WITH SHEAVES AND PULLEYS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to safety apparatus for use with sheaves and pulleys. More particularly, the present invention the relates to a safety apparatus that prevents fingers from entering into an area adjacent to the sheave or pulley. Additionally, the present invention relates to a safety apparatus tor use with sheaves and pulleys which have a pair of housings that are pivotally mounted so as to allow a line to pas therethrough.

2. Description of Related Art Including Information Disclosed Under 37 CFR 1.97 and 37 CFR 198

Pulleys and sheaves are used In a wide variety of offshore operations. In certain circumstances, the sheaves or pulleys can be supported from an overhead position so as to facilitate the ability to lift an object from a location so as to move the object to another location. In other circumstances, the pulleys or sheaves may extend in a horizontal orientation adjacent to a floor. In this configuration, the pulleys and/or sheaves can be utilized so as to adjustably position an object on the floor. During the use of such pulleys and sheaves, the operators will typically manipulate a line by pulling on the line. The use of the pulleys and sheaves facilitates the ability, by way of mechanical advantage, to direct an object to another location. Typically, will operators will wear gloves while manipulating the line that extends over the pulley.

In circumstances, the worker associated with such pulleys may move their hands very close to the actual pulley. If the gloved, hand should move too close to the pulley, there is a possibility of the glove being caught in the area between the line and the pulley. This can draw the worker's baud into the pulley. Under such circumstances, finger severing or impalement can occur. As such, a need has developed so as to provide a safety apparatus that effectively prevents the worker from ever encountering the situation where his or her fingers are drawn into the pulley.

As used herein, the term "sheave" can refer to a block, a pulley, or combinations thereof. The term "pulley" and "sheave" are used interchangebly herein. Additionally, the term "line" can refer to ropes, wire ropes, cords, cables and belts.

It is important to note that the operation of sheaves and pulleys can cause the line to extend at various angles Under certain circumstances, there will be a relatively wide angle between the portions of the line that extend between the worker and the object to be manipulated. In other circumstances, the line will extend generally adjacent to the object to be manipulated. As such, any safety apparatus would have to be adaptable to the various orientations of line that are required in the particular applications.

In the past, various patents have issued relating to safety and protection devices for use with sheaves and pulleys.

For example, U.S. Pat. No. 968,304, issued, on Aug. 23, 1910 to G. H. Winslow, describes a pulley guard. This pulley guard includes a shield in the form of a disc or plate having an upper portion provided with a slot terminating in an enlarged aperture to receive and lock over a headed stud or support. The disc or plate has a lower portion that covers the rotary member and is provided with a slot to slidingly engage the shaft of the rotary member. There is ah aperture above the slot to afford-access to the rotary member. A means is provided for adjusting and locking the plate in different positions on the support.

U.S. Pat. No. 1,175,065, issued on Mar. 14, 1916 to H. Kotten, provides a shaft and pulley guard. In particular, there is shaft guard, a means for vertically adjusting and supporting tire shaft guard, a pulley guard formed in sections and having an interlocking engagement with one portion of the shaft guard, and a means for supporting and relatively adjusting the pulley guard sections transversely.

U.S. Pat. No. 1,820,322, issued on Aug. 25, 1931 to B. L. Polkosnik, teaches a pulley guard and hanger. This pulley guard and hanger is stamped from a single piece of sheet metal so as to present a central bar member having extensions reaching in opposite directions at right angles from its ends. The bar is bent to produce an open loop extending outwardly. The extensions are looped to encompass the sides of the pulley. The free ends of the side loops are overlapped and secured to the junction of the connected ends.

U.S. Pat. No. 4,114,473, Sep. 19, 1978 to H. M. Pollak, describes guard for belt pulley. The guard includes a top wall for overlying a portion of the pulley's side face between the nips of the belt and the pulley. A side wall is connected to the top wall and extending generally at right angles therefrom. The guard has three projections on the side wall with each projection terminating in an arcuate end face juxtaposed to the inner diameter of one of the grooves of the pulley. Each arcuate end face on the projections has a center of curvature corresponding to the axis of rotation of the pulley. A mounting means is connected to one of the walls for mounting the walls in a position so that each of the projections enters one of the pulley grooves and one projection occupies substantially all the pulley grooves that are unoccupied by the belt.

U.S. Pat. No. 4,139,064, Issued on Feb. 13, 1979 to D. R. Dobberpuhl, provides a belt guard for a rotary tiller. The guard encloses the belt and has its forward end pivotally supported on a bracket fixed to the engine by a fastener which also serves to retain a belt guide in place. The rear end of the belt guard is supported for swinging about the forward connection.

U.S. Pat. No. 4,648,855, issued on Mar. 10, 1987 to Palloch et al., discloses a belt guard for industrial sewing machines which includes a cover made of two cover halves that can be clasped together. The cover extensively covers a V-belt pulley part.

U.S. Pat. No. 4,917,656, issued on Apr. 17, 1990 to Sato et al., provides a rear belt guard, for use in a sewing machine. The guard member is fixed to the table for covering a rear portion of a belt of the belt device that is exposed on the table. The guard member has an inclined wall upper portion provided with a notched recess for receiving the belt when the head is turned rearwardly. A cover member is openable and slidable over the notched recess. The cover member is urged by a spring in a direction to be closed.

U.S. Pat. No. 5,180,343, issued on Jan. 19, 1993 to M. A. Reed, discloses a pulley guard apparatus that can be mounted to an interior surface, of projecting flanges mounted on the pulley structure. Arcuate discs are arranged in confrontation in an edge-to-edge relationship with outer edges of the first and second, pulley flanges, preventing the binding and abrasion of a pulley belt.

U.S. Pat. No. 5,461,848, issued on Oct. 31, 1995 to L. Anthony; provides a mower pulley guard tor covering a wheel pulley. A semi-circular panel is positionable over the wheel pulley of the mower. A pair of lateral panels extend from opposed ends of the semi-circular panel and cooperate with a pair of mounting projections to secure the semi-circular panel to a pulley housing of the mower. The device cooperates with a cover plate of the mower to fully enclose the wheel pulley to preclude an entrance of debris into the policy housing.

U.S. Pat. No. 5,957,796, issued on Sep. 28, 1999 to V. McLean, provides a belt guard having a main rear wall with two slots for engaging over a pair of shafts of the pomp jack at the drive belt on the pulleys on the drive shafts. The rear cover portion includes a peripheral wall extending around the sides and top of the peripheral edge with the bottom of the cover panel being opened. A front panel portion fits over the rear cover panel with a lip engaging onto the peripheral wall to which it is secured.

U.S. Design Patent No. D540,256, issued on Apr. 10, 2007 to J. R. Bullock, Jr., describes a belt guard which includes a first housing that is hingedly connected to a second housing. Hinge pins can be utilized so as to fix the housings into a closed position.

It is an object of the present invention to provide a safety device for sheaves and pulleys that effectively prevents impaling or severing of fingers.

It is another object of the present invention to provide a safety device for use with sheaves and pulleys which does not interfere with the standard operation of the pulley, sheave or block.

It is another object of the present invention to provide a safety apparatus for use with sheaves and pulleys which is adaptable to various angles and orientations of the line with respect to the pulley.

It is a further object of the present invention to provide a safety apparatus which is easy to use, easy to manufacture, easy to install and relatively inexpensive.

These and other objects and advantages of the present invention will become apparent from a reading of the attached specification and appended claims.

BRIEF SUMMARY OF THE INVENTION

The present invention is a safety apparatus that comprises a sheave having a surface extending circumferentially therearound, a first housing interconnected to the sheave and having a hole formed at an end thereof opposite the sheave, and a second housing interconnected to the sheave and pivotally connected to the first housing. The second housing has a hole formed at an end opposite the sheave.

The sheave has an axis of rotation. An axle extends through this axis of rotation of the sheave. The first housing has an end surface opposite the sheave. The hole is formed through this end surface. A first hashing is affixed within the hole at the end surface of the first housing. This first bushing is a split bushing. The second housing has an end surface opposite the sheave. The hole of the second housing is formed through the end surface of the second housing. A second bushing is affixed within the hole at an end surface of the second housing. The second housing is pivotable between a first position in generally parallel relation to the first housing and a second position extending 180° relative to the first housing. The hole is in the form of a slot that extends to an edge of the end surface. The first housing is slidably insertable into the slot so as to reside at the end surface.

The first housing has a front wall and a back wall and a pair of side walls extending between the front wall and the back wall. Each of the front wall and the back wall have a flange extending toward the sheave. The flanges are pivotable relative to the sheave.

A line extends over the surface of the sheave. This line has a first portion extending through an interior of the first housing and outwardly through the hole of the first housing. The line has a second portion extending through an interior of the second housing and outwardly through the hole of the second housing. The holes of the first and second housings have a diameter slightly greater than a diameter of the line.

In the present invention, a first panel is provided in spaced parallel relationship to a second panel. The sheave is rotatably positioned between the first and second panels. The first housing is pivotally mounted at an exterior of the first and second panels. The second housing is pivotally mounted at an exterior of the first and second panels. The first housing has a first flange pivotally mounted relative to the first panel and a second flange pivotally mounted relative to the second panel. The second housing has a first flange interposed between the first flange of the first housing and the first panel. The second housing has a second flange interposed between the second flange of the first housing and the second panel. The first housing and the second housing are pivotable independent of a rotation of the sheave.

This foregoing section is intended to describe, with particularity, the preferred embodiment of the present invention. It is understood that variations in this preferred embodiment can be made within the scope of the present invention. As such, this section should not to be construed, in any way, as limiting of the scope of the present invention. The present invention should only be limited by the following claims and their legal equivalents.

DETAILED DESCRIPTION OF THE INVENTION

Figure 1:
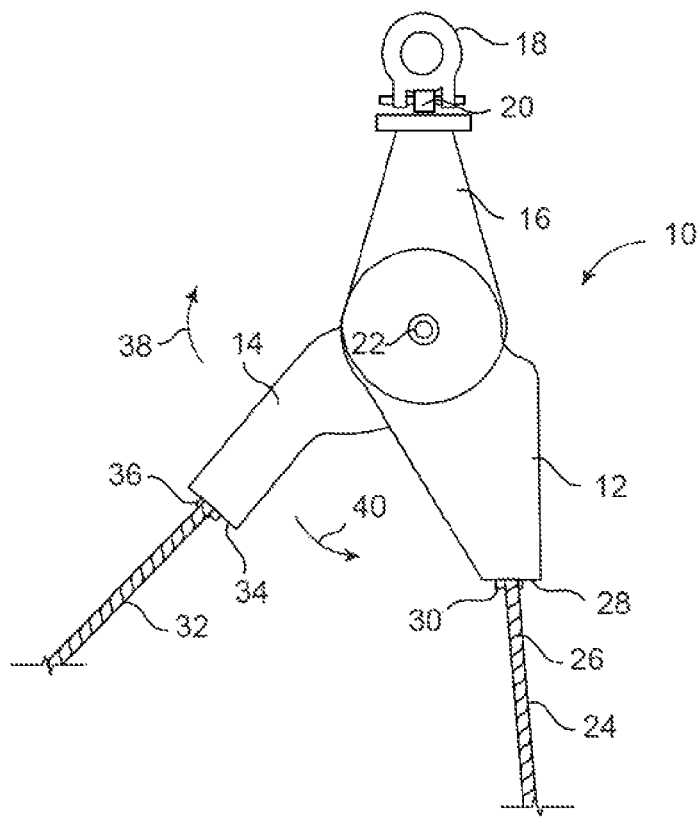
FIG. 1 is aside elevational view showing the safety apparatus in accordance with the preferred embodiment of the present invention.

Referring to FIG. 1, there is shown the safety apparatus in accordance with the preferred embodiment of the present invention. The safety apparatus 10 includes a sheave (not shown in FIG. 1), a first housing 12 and a second housing 14. The sheave will be enclosed by a first panel 16 and an opposite second panel (not shown in FIG. 1). A shackle 18 is fixedly mounted to the top of the panel 16. The shackle 18 can be pivotable about a journal 20.

As can be seen in FIG. 1, there is an axis of rotation 22. The sheave can rotate about this axis of rotation. This axis of rotation 22 can include an axle that extends through the safety apparatus of the present invention. In particular, the first housing 12 can be pivotally connected to the second housing 14 at this axis of rotation 22.

In FIG. 1, there is a line 24 that is illustrated as extending through the housings 12 and 14and around the sheave. In particular, the line 24 includes a first portion 26 that extends outwardly of an end surface 28 of the first housing 12. As will be described hereinafter, a bushing is affixed to this end surface 28 so as to provide a bearing surface upon which the line 24 can slide. The line 24 includes a second portion 32 that extends outwardly of the end surface 34 of the second housing 14. A bushing 36 is affixed into this end surface 34 so as to provide a bearing surface upon which the line 24 can slide. As used herein, the term "line" can include a variety of structures such as rope, wire rope, cords, cables, belts, and the like.

In normal use, a pulling force can be applied to either the first portion 26 or the second portion 32 of the line 24. The pulling force that is applied to one of the portions 26 and 32 of the line 24 will cause the other portion to be drawn inwardly over and around the sheave located within the safety apparatus 10. If the worker is guiding the second portion 32 when a pulling force is applied to the first portion 26, the entry of the worker's hands into the areas at the sheave is prevented by the blocking caused by the end surface 34 and/or the bushing 36. As such, any injury to the hand of the worker is effectively prevented. The bushing 36 will have an inner diameter only slightly greater than the outer diameter of the line 24 so that the possibility of the glove being drawn into the interior of the second housing 14 is prevented. In other circumstance, when a pulling force is applied to the portion 32, any worker that, is grasping the first portion 26 will avoid any possible injuries because of the blocking effect caused by the end surface 28 and/or the bushing 30. As such, the present invention effectively prevents the worker's hand from ever entering the area adjacent to the sheave within the safety apparatus 10. Arrows 38 and 40 illustrate the movement of the housings 12 and 14 relative to each other. The second housing 14 can move between a position in generally parallel relationship to the first housing 12 (in the manner shown in FIG. 5) to a position in the second housing 14 is offset by 180° from the first housing 13.

Figure 2:
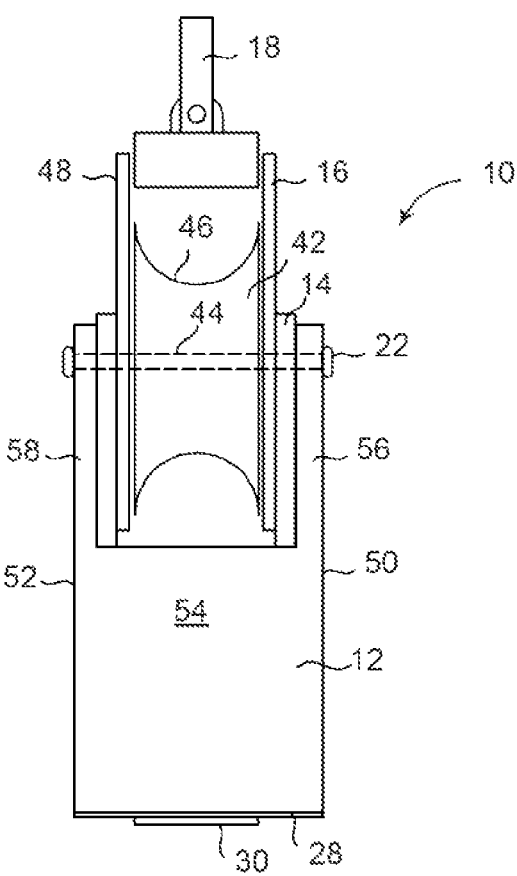
FIG. 2 is a end view showing the safety apparatus in accordance with the preferred embodiment of the present invention with the line omitted.

FIG. 2 is an end view of the safety apparatus 10 of the present invention. In particular, it can be seen that a sheave 42 that is mounted upon an axle 44 which extends at the axis of rotation 22. The sheave 42 has a surface 46 that extends circumferentially therearound. Surface 46 is an area upon which the line will be received. The shackle 18 is illustrated as extending at the upper end of the safety apparatus 10. Shackle 18 allows the apparatus 10 to be secured to a fixed object or location.

The safety apparatus 10 includes the first panel 18 and the second panel 48. First panel 16 is arranged in spaced parallel relationship to the second panel 48. The sheave 42 is interposed between the first panel 16 and the second panel 48. Panels 16 and 48 provide structural integrity to the sheave assembly of the present invention.

FIG. 2 shows that the first housing 12 has a front wall 50, a back wall 52, a first side wall 54 and a second sidewall (not shown). The side walls extend between front wall 50 and the back wail 52. The front wall 50 has a flange 56 extending therefrom. Similarly, the back wall 52 will have a flange 58 extending upwardly therefrom. Flanges 56 and 58 are mounted in pivotal relationship on the exterior of the respective panels 16 and 48. Similarly, the second housing 14 will have flanges on the front wall and the back wall thereof which are interposed between the respective flanges 56 and 58 of the first housing 12 and the respective panels 16 and 48. As a result, it can be seen that the first housing 12 can be pivotally connected to the second housing 14. The housings 12 and 14 can pivot in relationship to each other independently of the rotation of the sheave 42 about the axle 44. The first housing 12 has the end surface 28 opposite the sheave 42. The bushing 30 is affixed within a hole formed in the end surface 28.

Figure 3:
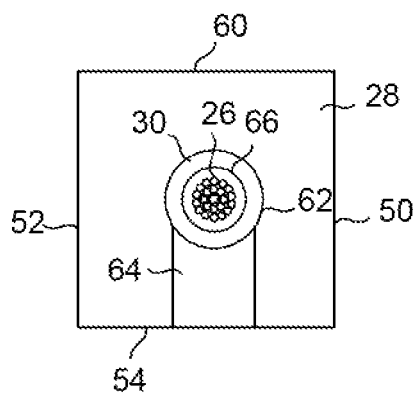
FIG. 3 is a bottom view of the end surface of one of the first and second housings of the safety apparatus of the present invention.

FIG. 3 is an isolated view of the end surface 28 of the first housing 12. The end surface 34 of the second housing 14 will be identical to the end surface 28. In FIG. 3, it can be seen that the end surface 28 will extend between the front wall 50, the back wall 52, the side wall 54 and the opposite side wall 60. In particular, a hole 62 is formed through the thickness of end surface 28. Hole 62 is in the nature of a slot 64 which is illustrated as extending to the side wall 54. The slot 64 can take a variety of configurations so as to lead to either the front wall 50, the back wall 52, or the other side wall 60. It can be seen that, there is a bushing 30 that is received within the hole 62. Bushing 30 is in the nature of a split bushing having a split 66 formed therein. The split 66 allows the bushing 30 to slide through the slot 64 so as to reside in the hole 62. The split bushing 30 also allows the bushing 30 to be applied onto the line 24 prior to insertion into the slot 64. As a result, it is not necessary to thread the bushing 30 along any substantial length of the line 24. The first portion 26 of the line 24 is illustrated as located within the interior of the bushing 30. The interior of the bushing 30 will have a diameter only slightly greater than the outer diameter of the line 24.

Figure 4:
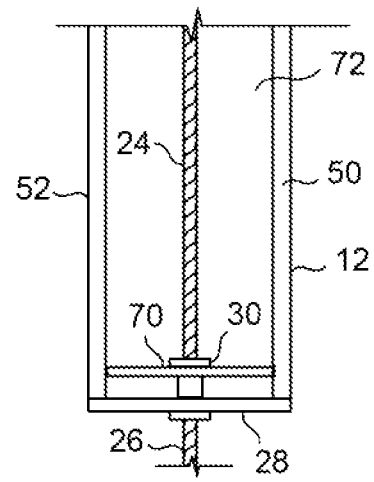
FIG. 4 is a cross-sectional view showing the positioning of the bushing at the end surface of the housing.

FIG. 4 shows that the bushing 30 has been affixed to the end surface 28 and is supported by a cross bar 70 extending between the front wall 50 and the back wall 52. As such, structural support for the bushing 30 is provided within the interior structure of the housing 12. A similar arrangement is provided in association with the second housing 14. The line 24 is illustrated as extending through the interior 72 of the first housing 12. The line 24 has the first portion 26 extending outwardly of the end surface 28 of the first housing 12. The line 24 extends through the interior of the bushing 30.

Figure 5:
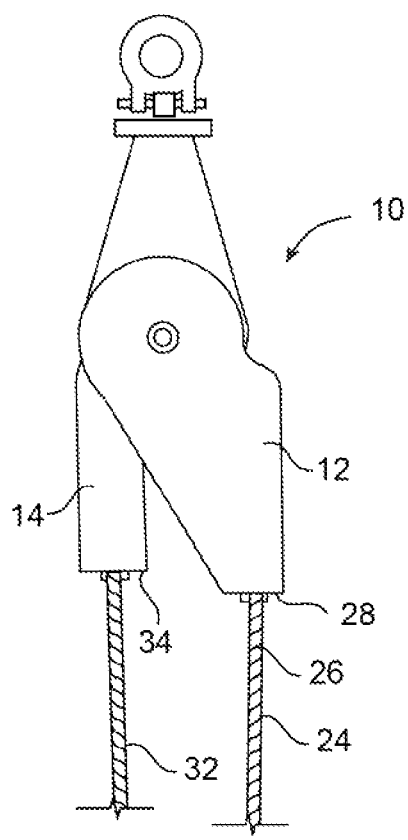
FIG. 5 is a side elevational view of the safety apparatus of the present invention with the housing extending in generally parallel relationship to each other.

FIG. 5 illustrates the safety apparatus 10 of the present invention with the first housing 12 illustrated as being in generally parallel relationship to the second housing 14. The line 28 is illustrated as having the first portion 26 in generally parallel relationship to the second portion 32. As such, the housings 12 and 14 will pivot in relationship to each other so as to establish this parallel relationship. The configuration of the safety apparatus 10 of the present invention, as illustrated in FIG. 5, is utilized whenever the load to be moved is generally adjacent to the worker that is moving the load. Under all circumstances, the respective end surfaces 28 and 34 of the first housing 12 and the second, housing 14 would prevent any accidental entry of the fingers of the worker into the area adjacent to the sheave.

Figure 6:
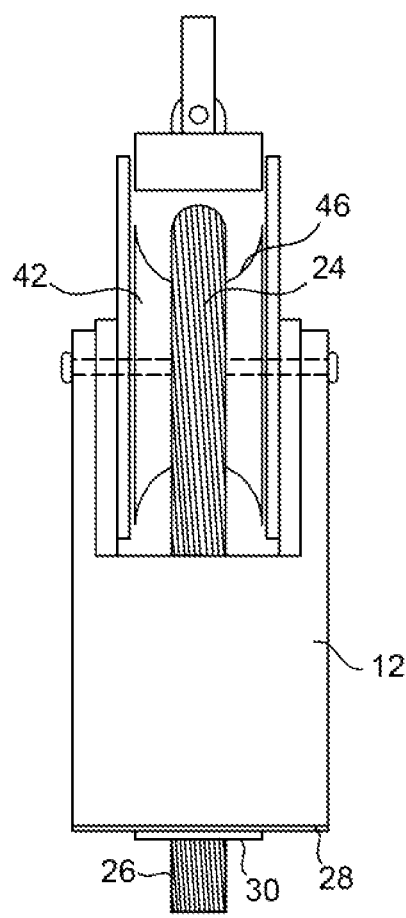
FIG. 6 is an end view showing a line as extending over the surface of the sheave of the safety apparatus of the present invention.

FIG. 6 illustrates the line 24 as extending over the surface 46 of the sheave 42. Line 24 will have its first portion 26 extending outwardly of the bushing 30 at the end surface 28 of the first housing 12. It can be seen that the sheave 42 is substantially spaced from the end surface 28. As such, there is no possibility of injury to the worker's fingers as caused by the physical relationship between the line 24 and the sheave 42.

Figure 7:
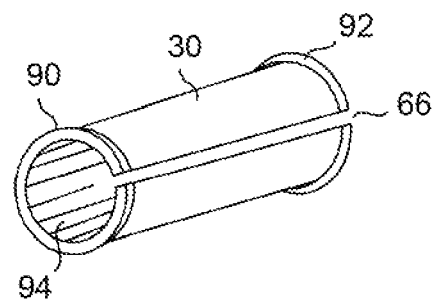
FIG. 7 is a isolated perspective view of the split bushing as used on the end surface of the housing of the safety apparatus of the present invention.

FIG. 7 is an isolated, view of the split bushing 30. Split bushing 30 has a split 66 formed so as to extend longitudinally therealong. The split bushing 30 is illustrated as having a flange 90 at one end and a flange 92 at an opposite end. These flanges 90 and 92 extend circumferentially around the bushing 30. As such, flanges 90 and 92 facilitate the ability to locate the split bushing 30 at the end surfaces of the respective housings. The split bushing 30 has an interior 94 suitable for allowing the line 24 to slide therein. As such, any sharp edges associated with the end surfaces 28 and 34 of the respective housings 12 and 14 will not be damaged by continual contact with the outer surfaces of the line. The split bushing 30 can be interchanged so as to accommodate the various diameters of lines that may extend through and along the sheave 42.

The foregoing disclosure and description of the invention is illustrative and explanatory thereof Various changes in the details of the illustrated construction can be made within the scope of the appended claims without departing from the true spirit of the invention. The present invention should only be limited by the following claims and their legal equivalents.

We claim:

1. A safety apparatus comprising:
   a sheave having a surface extending circumferentially therearound;
   a first housing interconnected to said sheave, said first housing having a hole formed at an end thereof opposite said sheave, said first housing having an end surface opposite said sheave, said hole of said first housing formed through said end surface, said hole having a slot extending to an edge of said end surface;
   a second housing interconnected to said sheave and pivotally connected to said first housing, said second housing having a hole formed at an end opposite said sheave; and
   a first bushing affixed within said hole at said end surface of said first housing, said first bushing being slidably insertable into said slot.

2. The safety apparatus of claim 1, said sheave having an axis of rotation, the safety apparatus further comprising:
   an axle extending through said axis of rotation of said sheave.

3. The safety apparatus of claim 1, said first bushing being a split bushing.

4. The safety apparatus of claim 1, said second housing having an end surface opposite said sheave, said hole of said second housing formed through said end surface of said second housing, the safety apparatus further comprising:
   a second bushing affixed within said hole at said end surface of said second housing.

5. The safety apparatus of claim 1, said second housing being pivotable between a first position in generally parallel relation to said first housing and a second position extending 180° relative to said first housing.

6. The safety apparatus of claim 1, said first housing having a front wall and a back wall and a pair of side walls extending between said front wall and said back wall, each of said front wall and said back wall having a flange extending toward said sheave, the flanges being in pivotable relation to said sheave.

7. The safety apparatus of claim 1, further comprising:
   a first panel; and
   a second panel in spaced parallel relation to said first panel, said sheave being rotatable positioned between said first and second panels.

8. The safety apparatus of claim 7, said first housing being pivotally mounted at an exterior of said first and second panels, said second housing being pivotally mounted at the exterior of said first and second panels.

9. The safety apparatus of claim 8, said first housing having a first flange pivotally mounted relative to said first panel and a second flange pivotally mounted relative to said second panel, said second housing having a first flange interposed between said first flange of said first housing and said first panel, said second housing having a second flange interposed between said second flange of said first housing and said second panel.

10. The safety apparatus of claim 1, said first housing and said second housing being pivotable independent of a rotation of said sheave.

11. A safety apparatus comprising:
   a sheave having a surface extending circumferentially therearound;
   a first housing interconnected to said sheave, said first housing having a hole formed at an end thereof opposite said sheave, said first housing having an end surface opposite said sheave, said hole of said first housing formed through said end surface, said hole having a slot extending to an edge of said end surface;
   a second housing interconnected to said sheave and pivotally connected to said first housing;
   a line extending over said surface of said sheave, said line having a first portion extending through an interior of and said first housing and outwardly through said hole of said first housing, said line having a second portion extending through an interior of said second housing and outwardly through said hole of said second housing.

12. The safety apparatus of claim 11, the holes of said first and second housings having a diameter slightly greater than a diameter of the line.

13. A safety apparatus comprising:
   a sheave having a surface extending circumferentially therearound;
   a first housing interconnected to said sheave, said first housing having a hole formed at an end thereof opposite said sheave;
   a second housing interconnected to said sheave and pivotally connected to said first housing, said second housing having a hole formed at an end opposite said sheave;
   a line extending over said surface of said sheave, said line having a first portion extending through an interior of said first housing and outwardly through said hole of said first housing, said line having a second portion extending through an interior of said second housing and outwardly through said hole of said second housing.

14. The safety apparatus of claim 13, said first housing having an end surface opposite said sheave, said hole formed through said end surface, the safety apparatus further comprising:
   a first bushing affixed within said hole at said end surface of said first housing.

15. The safety apparatus of claim 14, said first bushing being a split bushing.

16. The safety apparatus of claim 14, said hole being a slot extending to an edge of said end surface, said first bushing being slidably insertable into said slot.

17. The safety apparatus of claim 13, said second housing being pivotable between a first position in generally parallel relation to said first housing and a second position extending 180° relative to said first housing.

18. The safety apparatus of claim 13, further comprising:
a first panel; and
a second panel in spaced parallel relation to said first panel, said sheave being rotatable positioned between said first and second panels.

* * * * *